US006871351B2

United States Patent
Yamauchi et al.

(10) Patent No.: US 6,871,351 B2
(45) Date of Patent: Mar. 22, 2005

(54) DISC DRIVING APPARATUS (75) Inventors: Yoshiaki Yamauchi, Minori (JP); Katsuhiko Kimura, Chiyoda (JP); Mitsuo Satake, Yokohama (JP); Manabu Ochi, Chiyoda (JP); Seiichi Kato, Chiyoda (JP)

(73) Assignees: Hitachi, Ltd., Tokyo (JP); Hitachi Media Electronics Co., Ltd., Mizusawa (JP)

( * ) Notice: Subject to any disclaimer, the term of this patent is extended or adjusted under 35 U.S.C. 154(b) by 408 days.

(21) Appl. No.: 09/928,346

(22) Filed: Aug. 14, 2001

(65) Prior Publication Data
US 2003/0021220 A1 Jan. 30, 2003

(30) Foreign Application Priority Data
Jul. 27, 2001 (JP) ........................................ 2001-227236

(51) Int. Cl.[7] ................................................ G11B 7/08
(52) U.S. Cl. .................................................... 720/671
(58) Field of Search ........................... 720/671; 369/249, 369/292, 112.01, 120, 121, 112.17, 44.23, 112.16, 44.11, 244; 372/35; 250/239

(56) References Cited
U.S. PATENT DOCUMENTS 5,581,523 A * 12/1996 Seki et al. ................ 369/44.11
6,430,143 B1 * 8/2002 Kajiyama et al. ........... 369/244

* cited by examiner

Primary Examiner—Tianjie Chen
(74) Attorney, Agent, or Firm—Antonelli, Terry, Stout & Kraus, LLP (57) ABSTRACT In a disc driving apparatus, wherein a laser diode and a laser driver circuit board are mounted on a pickup housing in thermal contact therewith and are disposed adjacent to each other, a heat separation member is provided between the laser diode and the laser driver circuit board for effecting thermal separation therebetween, thereby reducing the thermal interference between the heat-generating elements that are adjacent to each other in the optical pickup. This makes it possible to protect the heat-generating elements from being deteriorated, leading to a reduction in the lifetime thereof, as well as, to improve the reliability thereof.

4 Claims, 4 Drawing Sheets

DISC DRIVING APPARATUS

BACKGROUND OF THE INVENTION

The present invention relates to a disc driving apparatus equipped with an optical pickup for reproducing or reproducing/recording information on an optical disc; and, in particular, the invention relates to a disc driving apparatus which is suitable for as a so-called CD-ROM drive, a DVD-ROM drive, and a DVD-RAM drive, etc.

A laser light generation device and an optical disc read-out/write-in apparatus equipped therewith have been described in, for example, Japanese Patent Laying-Open No. Hei 10-283650 (1998) (conventional art 1). In such a device, a thermally conductive sheet is disposed between a first heat radiation member and a second heat radiation member, wherein the area of control is increased between the first heat radiation member and the second heat radiation member, compared to the case where both members are in contact with each other directly. Thereby, radiating heat, which is generated in a heat generating element, such as a semiconductor laser element, flows into the second heat radiation member effectively, so as to cool down the semiconductor laser element with high efficiency.

Also, an optical pickup was described in, for example, (conventional art 2). In such an optical pickup, by using a prism made of plastic therein, an optical pickup is provided that can detect an excellent signal without causing shifting of the optical axis within the plastic prism due to a change of temperature. In this regard, a spacer for purposes of heat insulation is placed between an optical system forming the optical pickup and a silicon substrate on which a laser diode, appearing as a heat generating element, is provided for emitting a laser light beam into the optical system, so as to form a layer of air having low thermal conductivity, thereby enabling radiation of heat from the laser diode into the silicon substrate.

However, in the above-described conventional arts 1 and 2, there is no disclosure concerning deterioration of the lifetime of parts or elements, erroneous operation, or a decrease in the reproducing/recording accuracy, accompanying a non-uniform local temperature distribution, due to thermal interference between adjacently disposed heat generating elements and/or heat generation of a heat-generating element. Therefore, there is a possibility that, in a case where plural numbers of heat-generating elements are disposed at neighboring locations relatively close to each other, due to the thermal interference between the heat-generating elements, elements having a small heat generation amount and/or elements of low heat-resistance or endurance are affected with the thermal influences provided by other heat-generating elements, erroneous operation, and/or a decrease in the reproducing/recording accuracy.

Namely, in general, within a disc drive or apparatus equipped with an optical pickup, there are mounted a laser diode which generates heat when it performs a recording/reproducing operation, a laser driver circuit board, a high frequency module, and plural numbers of parts or elements, such as a driver coil for use in an objective lens driver, etc., to be connected thermally, in a pickup housing made of metal, and heat generation of those heat-generating elements causes a local non-uniform temperature distribution within the pickup housing, thereby causing thermal interference between those heat-generating elements. In particular, with respect to multi-functions of the disc drive apparatus, various disc drive apparatuses have been developed which are equipped with a CD-R/RW function for recording information on the disc, a DVD-R/RW function for a disc of much larger recording capacity, and/or a DVD-RAM function, etc. In those disc drive apparatuses, the detection light (i.e., a laser light beam) emitted from the laser diode provided within the optical pickup typically has a very large output, and also a large number of heat-generating elements must be disposed in close proximity with each other, due to a demand for reduction in the size thereof. Because of those heat-generating elements, the following problems are created (1) Thermal interference due to the close disposition of the heat-generating elements;

(2) Thermal deformation due to a locally non-uniform temperature distribution;

(3) A deterioration of the lifetime of elements due to heat; and (4) A local rise in temperature inside of the apparatus due to heat radiation from the elements functioning as a heat source, and erroneous operation or malfunction in a circuit system.

SUMMARY OF THE INVENTION

An object of the present invention is to provide a disc driving apparatus, wherein thermal interference is reduced between heat-generating elements which are disposed in close proximity with each other, in particular, in the optical pickup, so as to protect the heat-generating elements from deterioration leading to reduction in the lifetime thereof, thereby providing a disc during apparatus having a high reliability.

Another object of the present invention is to provide a disc driving apparatus, wherein thermal interference is reduced between heat-generating elements disposed in close proximity with each other, in particular, in the optical pickup, so as to enable protection of the heat-generating elements from deterioration leading to reduction in the lifetime thereof, and in which a shift of the detection light reproducing or reproducing/recording, thereby providing a disc driving apparatus having high reliability and which is also able to achieve reproducing or reproducing/recording of information with high definition.

A further object of the present invention is to provide a disc driving apparatus, wherein thermal interference is reduced between the heat-generating elements disposed in close proximity with each other, in particular, in the optical pickup, so as to enable protection of the heat-generating elements from deterioration leading to reduction in the lifetime thereof, and in which the strength or rigidity of a pickup housing is secured, as well, so as to improve the accuracy in reproducing or reproducing/recording, thereby providing a disc driving apparatus having high reliability and which is also able to achieve reproducing or reproducing/recording of information with high definition.

First, according to the present invention, for accomplishing the above-mentioned objects, there is provided a disc driving apparatus, comprising: a housing for a disc drive; a rotation mechanism accommodated within said housing for rotating a disc; and an optical pickup mechanism disposed within said housing for reproducing or reproducing/recording information on the disc. The optical pickup mechanism has an optical pickup and a driving mechanism for driving said optical pickup in a radial direction of said disc. The optical pickup comprises a pickup housing made of metal, in beam for reproducing or recording information on said disc, a laser driver circuit board for controlling said laser diode, an objective lens driver for guiding the detection light beam emitted from the laser diode to a predetermined position on said disc and for guiding reflection light from said disc onto an optical detector, optical parts, including a lens, a prism, a mirror therein, and an optical detector for detecting said detection light. The laser diode and laser driver circuit board are mounted thermally in contact with said pickup housing, so as to be disposed adjacent to each other, while providing a thermal separation portion for thermally separating said laser diode and said laser driver circuit board.

Second, according to the present invention, for accomplishing the above-mentioned objects, there is also provided a disc driving apparatus, comprising: a housing for a disc drive; a rotation mechanism accommodated within said housing for rotating a disc; and an optical pickup mechanism disposed within said housing for reproducing or reproducing/recording information on the disc. The optical pickup mechanism has an optical pickup and a driving mechanism for driving said optical pickup in a radial direction of said disc. The optical pickup comprises a pickup housing made of metal, in which are mounted a laser diode for emitting a detection light beam for use in a CD system, so as to reproduce or record information on said disc, a laser diode as to reproduce or record information on said disc, a laser driver circuit board for controlling said laser diode for use in the CD system, an objective lens driver for guiding the detection light beam emitted from to a predetermined position on said disc and for guiding reflection light from said disc onto an optical detector, optical parts, including a lens, a prism, a mirror therein, and an optical detector for detecting said detection light. The laser diode for use with a CD, the laser diode for the use with a DVD, the laser driver circuit board and the objective lens driver are mounted in contact with said pickup housing so as to be thermally disposed adjacent to each other, while providing a thermal separation portion for thermally separating a side of said laser diodes for use with a CD and DVD and a side of said laser driver circuit board and said objective lens driver.

Third, according to the present invention, for accomplishing the above-mentioned objects, there is further provided a disc driving apparatus, comprising: a housing for a disc drive; a rotation mechanism accommodated within said housing for rotating a disc; and an optical pickup mechanism disposed within said housing for reproducing or reproducing/recording information on the disc. The optical pickup mechanism has an optical pickup and a driving mechanism for driving said optical pickup in a radial direction of said disc. The optical pickup comprises a pickup housing made of metal, in which are mounted a laser diode for emitting a record information on said disc, a laser diode for emitting a detection light beam for use with a DVD, so as to reproduce or record information on said disc, a laser driver circuit board for controlling said laser diode for use with a CD, an objective lens driver for guiding the detection light beam emitted to a predetermined position on said disc and for guiding reflection light from said disc onto an optical detector, optical parts, including a lens, a prism, a mirror therein, and an optical detector for detecting said detection light. The pickup housing is defined by a sidewall formed all around the periphery thereof and a bottom wall, and said laser diodes for use with a CD and DVD, wherein said laser diode for use with a CD and said laser driver circuit board are mounted thermally in contact with said pickup housing and are disposed adjacent to each other, while providing a thermal separation portion for thermally separating a side of said laser diodes for use with a CD and DVD and a side of said laser driver circuit board and said objective lens driver.

DESCRIPTION OF PREFERRED EMBODIMENTS

Hereinafter, embodiments according to the present invention will be fully explained with reference to the attached drawings. However, the same reference numerals indicate the same elements or equivalents thereof in each of the embodiments.

Figure 1:
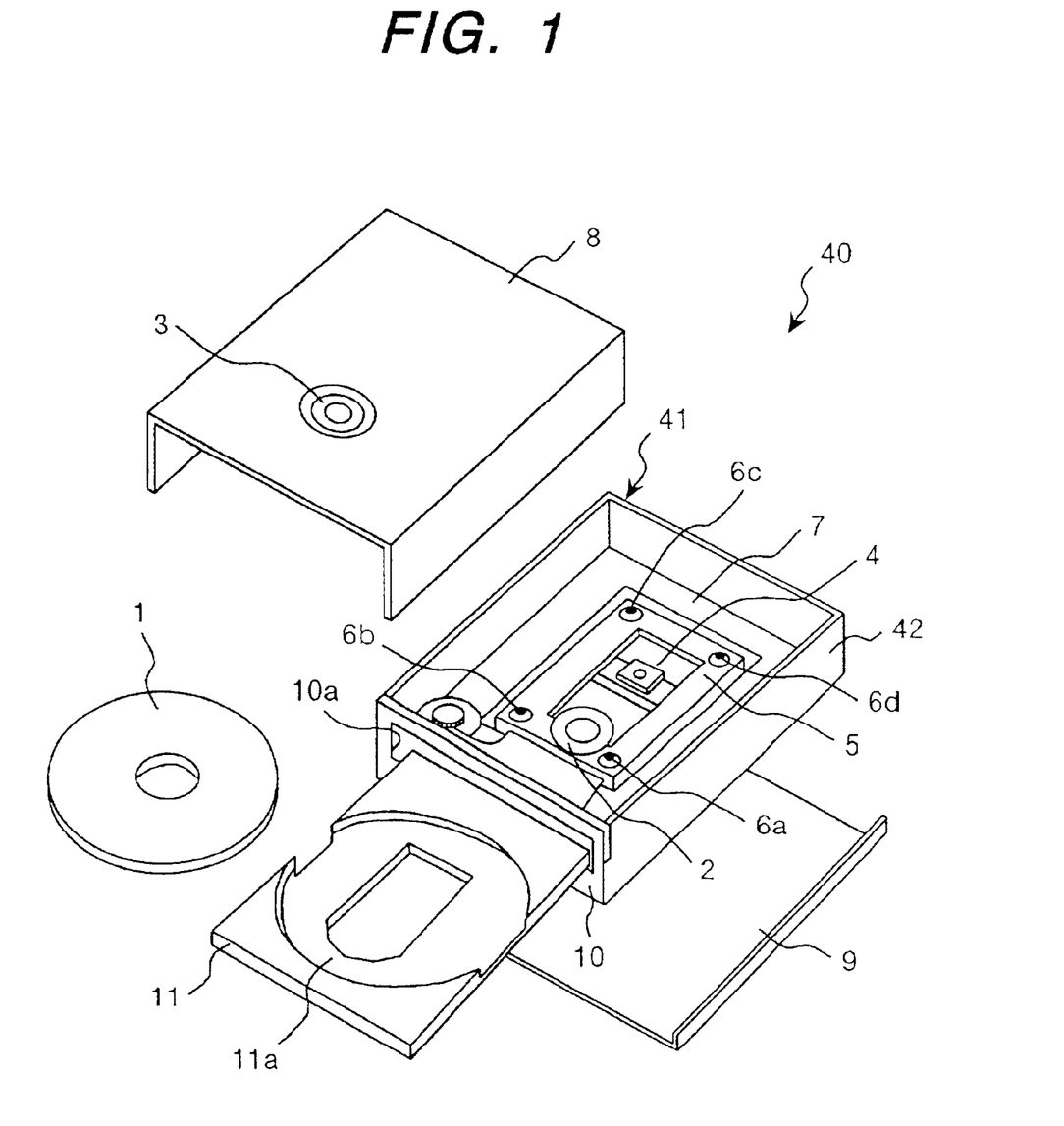
FIG. 1 is an exploded perspective view of a disc driving apparatus, according to a first embodiment of the present invention.

First, an explanation will be given of a first embodiment according to the present invention with reference to FIGS. 1 to 3.

First of all, the overall structure of the disc driving apparatus according to the present embodiment and the operation thereof will be explained with reference to FIG. 1, which is an exploded perspective view of the disc driving apparatus according to the first embodiment of the present invention.

A disc driving apparatus 40, being a DVD-ROM apparatus corresponding to a CD-R/RW device, comprises a disc driver housing 41, a disc loading mechanism for carrying a disc 1 into and out of the disc driver housing 41, and a reproducing/recording mechanism for reproducing/ recording information on the disc 1. This disc driving apparatus 40 is used therein. Further, the present invention is applicable to a device such as a CD-ROM drive, a DVD-RAM drive, etc.

The disc driver housing 41 has sidewalls 42 in a rectangular shape as seen in plane view, a mechanical base 7 formed within the space defined by the sidewalls 42, a top cover for covering over an upper surface opening of the sidewalls 42, and a bottom cover 9 for covering a lower surface opening of the sidewalls 42, thereby defining an inner almost closed space, so as to store elements capable of heat generation therein. Furthermore, since the elements of the disc driver housing 41 are thin and the inner space for accommodating a large number of heat generating elements is small due to a demand for down-sizing of the apparatus, the thermal conditions under which the elements are stored becomes very severe or strict. And, in a front panel 10 which represents a front surface of the disc driver housing formed by the sidewalls 42 there is a transportation or access opening 10a for allowing a disc tray 11 to be carried in or out therethrough.

The disc loading mechanism comprises the disc tray 11, including a mounting portion 11a for mounting a disc thereon, a transportation or access driver mechanism for carrying the disc tray 11 into the disc driver housing 41 through the access opening 10a, so as to mount the disc on a spindle motor 2, a disc clamper 3 for fixing the disc 1 onto a turn table of the spindle motor 2, and an up-down driver mechanism for motor 2 by means of the disc clamper 3. The access driver mechanism and the up-down driver mechanism are constituted by a loading motor, a gear for transmitting driving force of a motor, and a driving force transmitting member, etc. Also, the disc clamper 3 is attached to the top cover 8 at a predetermined portion thereof.

The reproducing/recording mechanism comprises a rotation driver mechanism for rotating the disc 1, and an optical pickup mechanism for performing reproducing/recording of information on the rotating disc 1. In more detail, it comprises the unit mechanical chassis 5, a unit holder, the spindle motor 2 mounted on the unit mechanical chassis 5, the optical pickup 4 mounted on the mechanical chassis 5, and the disc clamper 3 attached on the top cover 8. Further, the disc 1 is an information recording medium in having disc-like shape.

The unit mechanical chassis 5 is formed in about a rectangular shape on the top plane view thereof, and it is attached on the unit holder (not shown in the figure) at each of the four corners thereof through elastic members 6*a*–6*d*, respectively. Further, the unit holder is inserted into the mechanical base 7 so as to be connected therewith. The elastic members 6*a*–6*d* are provided for the purpose of attenuation of vibration and/or shock transmitted from outside of the apparatus to the unit mechanical chassis 5. And, the spindle motor 2 has a turn table for mounting the disc 1 while holding it, together with the disc clamper 3, for the purpose of reproducing/recording on the disc. The disc clamper 3 is attached to the top cover 8 at a position just above the spindle motor 2.

Also, the optical pickup mechanism comprises the optical pickup 4 for reproducing information on the disc 1, which is mounted on the spindle motor, and for recording information thereon, and a radial direction driver mechanism for shifting or moving that optical pickup 4 in the radial direction of the disc 1.

Herein, an explanation will be given of the total operation of such a disc driving apparatus 40. The operation of the disc driving apparatus 40 is made up of a disc loading operation in which a disc 1 is carried into the disc drive housing 41, so as to bring the disc 1 into a reproducible or recordable position, and a reproducing/recording operation for performing reproducing/recording of the disc 1 which has been loaded therein.

The disc loading operation will be explained. First, the access driver mechanism of the disc loading mechanism is actuated, so as to cause the disc tray 11 to move out through the access opening 10*a* (in the condition shown in FIG. 1); and, after the disc 1 is mounted on the mounting portion 11*a*, the access driver mechanism is actuated again to carry the disc tray 11 into the disc drive housing 41, thereby mounting it on the turn table of the spindle motor 2. Next, for fixing surface of the top cover 8, opposing the disc 1, the spindle motor 2, the optical pickup 4, and the unit mechanical chassis 5 holding those elements thereon are elevated by means of the up-down driver mechanism, as one unit.

In the reproducing/recording operation, under the condition that the disc 1 is loaded into the disc drive housing 41 and is fixed on the spindle motor 2, the spindle motor 2 rotates at a predetermined speed, thereby to rotate the disc 1. Under this condition, the reproducing and recording of information on the disc is carried out by shifting or moving the optical pickup 4 provided on the unit mechanical chassis 5 in the radial direction of the disc 1.

Next, an explanation will be given of the details of the optical pickup 4 with reference to FIGS. 2(*a*) and 2(*b*). FIGS. 2(*a*) and 2(*b*) show a plane view of the optical pickup in the disc driving apparatus of FIG. 1 and a cross-sectional view thereof, respectively. Further, FIG. 2(*b*) is a cross-section taken along the line A—A in FIG. 2(*a*).

The optical pickup 4 comprises a pickup housing 24 for mounting each of the elements, which are necessary for the reproducing/recording operations. This pickup housing 24 of a box type is made of a metal material having good thermal conductivity, such as aluminum, magnesium, zinc, etc., and is made up of sidewalls 24*a* and a bottom wall 24*b*, to be formed in about a trapezoidal shape as seen in the plane view thereof. On the sidewall 24*a* at one side (i.e., on the upper through which a guide bar 21 penetrates, and two slide bearings 22 are inserted with pressure into respective end portions of this opening 24*c*. Also, on the sidewall 24*a* at the other side (i.e., on the lower side in FIGS. 2(*a*) and 2(*b*)) there is formed a bearing 23 therewith as a unit which projects therefrom. And, guide bars 21 extend on both sides of the pickup housing for axially supporting the pickup housing 24 by way of the bearings 22 and the bearing 23. With this construction, the pickup housing 24 is movable in the radial direction of the disc 1 (in the horizontal direction as seen in FIGS. 2(*a*) and 2(*b*)), thereby being supported so as to be freely slidable with respect to a guiding axis of the guide bar 21.

Within the pickup housing 24, there are various parts or elements, such as, two detector systems for use with both CD and DVD, respectively. Namely, the pickup housing 24 comprises a laser diode 27 (of wavelength: 780 nm) for use with a CD, a laser diode 28 (of wavelength: 650 nm) for use with a DVD, both serving as a detection light source, a prism 31 for guiding those detection light beams upon the disc 1, a mirror 30, a collimator lens 32, a common photo-detector 34, for use with both a CD and a DVD, for detecting the reflection light from the disc 1, a driver circuit board 29 for the laser diode 27 for CD use, a driver circuit for the laser diode 28 for DVD use, a high frequency module, and a front monitor 35, an objective lens for determining the detection light on the disc 1 at a predetermined position accurately, etc.

As to the dispositions of those parts or elements, the pickup housing 24 is formed in a box-like shape, wherein the laser diode 27 for CD use, the laser diode 28 for DVD use, the photo-detector 34 and so on are attached at cut-out portion (or an opening-like portion) provided on a sidewall 24*a* of the pickup housing 24, while the other optical parts or elements are mounted on a bottom wall 24*b* within the pickup housing 24, and, further, the laser driver circuit board 29 is mounted on a lower surface of the bottom wall 24*b*.

Among the parts or elements mentioned above, that are installed within the optical pickup 4, certain elements generate heat when the apparatus performs reproducing/recording operations, including the driver coil, which is used in the objective lens driver 26, the laser diode 27 for CD use, the laser diode 28 for DVD use, the laser driver circuit board 29, the high frequency module, etc., and those elements are mounted on the pickup housing 24 in thermal contact therewith. With this arrangement, each of those heat-generating elements radiates heat by conducting it into and through the pickup housing 24, as they generate heat and cause the temperature thereof to rise. Also, those heat-generating elements are disposed so as to be adjacent to each other in rather close in proximity due to the recent demands for down-sizing of the optical pickup 4. In circuit board 29 are disposed very close to each other. In addition, the laser diode 27 for CD use increases its output remarkably, in particular when performing a recording operation, compared to that when performing a reproducing operation, thereby increasing the heat generation; however, in general, it has a low heat-resistance temperature.

Within the pickup housing 24, there is provided a thermal separation member 25 at a position between the laser diode 27 for CD use and the laser driver circuit board 29, for the purpose of thermally separating them. This thermal separation member 25 is extended, so that the side of the housing where the laser driver circuit board 29 and the objective lens driver 26 are located is separated thermally from the side of the housing where the laser diode 27 for CD use and the laser diode 28 for DVD use, and this separation is constructed with a slit portion and a recessed gutter formed in the pickup housing 24 and the heat separation member 25.

The heat separation member 25 is made of material having a smaller thermal conductivity than that of the pickup housing 24, such as a PPC resin (polyphenylene sulfide), polycarbonate, polystyrene, etc., and it is so provided that it separates the laser diode 27 for CD use thermally from the pickup housing 24, which is positioned between the laser diode 27 for CD and the laser driver circuit board 29. In case of taking the strength or rigidity of the pickup housing 24 into the consideration, it is preferable to put in or mix a material, such as glass filler, etc., into the material thereof, for increasing the rigidity thereof. This heat separation member 25 is fills up the inside of the slit which divides the bottom wall 24b into two portions, and is disposed within the recessed gutter on the lower surface side of the sidewall 24a on an extended line from this slit portion, so as to be formed as one unit. The recessed gutter of this sidewall 24a is located in the middle between the laser diode 27 for CD use and the laser driver circuit board 29. In this manner, the heat separation member 25 is provided within the pickup housing 24, for the purpose of providing heat separation between the laser diode 27 for CD use, which emits a large amount of heat when recording information on a disc in a CD-R/RW device, and the laser driver circuit board 29 to support CD operations within the housing. In other words, the heat separation portion 25 is provided so that the pickup housing 24 is divided into two parts, thermally, between the laser diode 27 for CD use and the laser driver circuit board 29 to support CD operations.

Also, the heat separation member 25 is provided almost along the entire width in both directions of the pickup housing 24, so as to separate the laser driver circuit board 29 and the objective lens driver 26 from the laser diode 27 for CD use and the laser diode 28 for DVD use, thermally. And, the prism 31, the mirror 30 and the optical detector 34 are positioned on the same side as the laser diode 27 for CD use and the laser diode 28 for DVD use.

As mentioned above, the pickup housing 24 is made of a metal material, such as aluminum, magnesium, zinc, etc., and the thermal conductivity is about 200 kcal/mh° C. for aluminum, about 150 kcal/mh° C. for magnesium, about 100 kcal/mh° C. for zinc; therefore, the heat generated from the heat-generating elements 26 to 29 is preferably conducted to the pickup housing 24 and is radiated from the surface of the pickup housing 24. On the other hand, the thermal conductivity of the heat separation member 25 is about 0.2 kcal/mh° C. since it is made of a resin material. Thus, putting the heat separation member 25 between them makes it possible to reduce to about 0.001 times as small the thermal flow-through within the pickup housing 24. And, as apparent from the FIG. 2(a), by providing the heat separation member 25 on the bottom surface side within the pickup housing 24 such that it is covered on the side surface thereof with a part of the pickup housing 24, the housing and the heat separation member can be formed as one unit.

Further, it is also possible to make the space of the slit portion and the recessed gutter formed in the pickup housing 24 in a form of an air layer, rather than filling up the space with the heat separation material 25. In this case, the thermal conductivity of the air is about 0.03 kcal/mh° C., which is smaller than that of the material of the resin group; therefore, it has a large effect on the heat separation, but the rigidity of the optical pickup 4 is lowered, so that the heat separation member 25 will be needed if it is necessary to provide adequate rigidity for the optical pickup 4. Also, if the slit portion and the recessed gutter in the pickup housing 24 are formed to have a fin-like structure (i.e., a concave and convex structure), in the case of being filled up with air to form an air layer, it is possible to improve the effect of heat radiation into the air, remarkably, with the effect of heat separation.

Figure 2A:
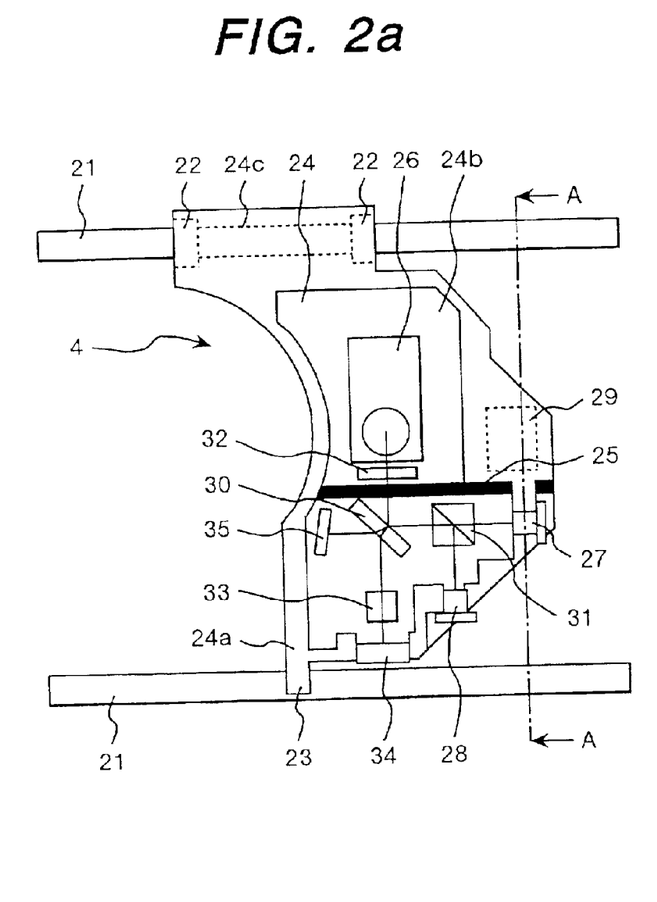
FIGS. 2(a) and 2(b) show a plane view and a cross-sectional view of an optical pickup in the disc driving apparatus of FIG. 1.
Figure 2B:
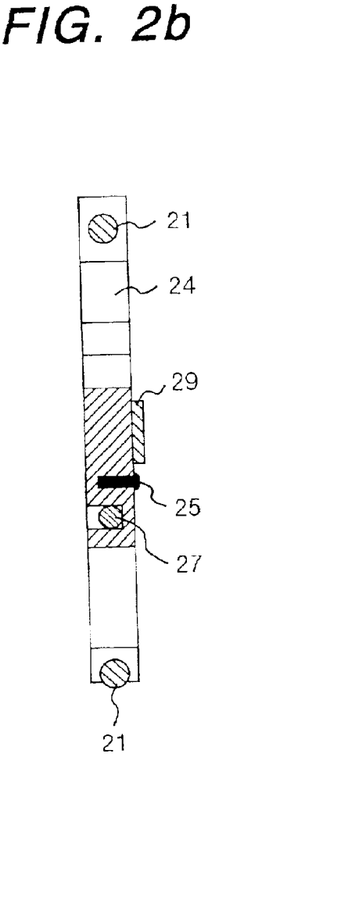
Figure 3A:
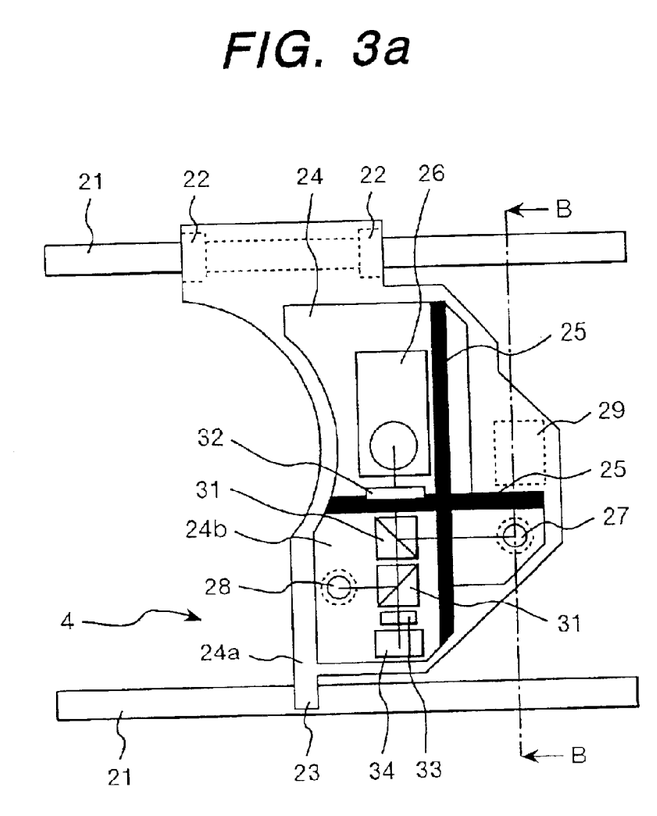
FIGS. 3(a) and 3(b) show a plane view and a apparatus, according to a second embodiment of the present invention.

With an optical pickup 4 having the structure as described above, the heat generated from the laser diode 27 for CD use is radiated upon the lower side of the pickup housing 24, as seen in the FIGS. 2(a) and 2(b), and it is radiated from the laser driver circuit board 29 upon the upper side of the housing, as also seen in the FIGS. 2(a) and 2(b). Therefore, it is possible to achieve an effective heat radiation, so that a uniform thermal distribution can be brought about over the pickup housing 24. In this case, on the lower side of the pickup housing 24, which is separated by the heat separation member 25, there are disposed the laser diode 28 for DVD use, and so on, which also generates heat when the apparatus operates, and also on the upper side of the housing, the objective lens driver 26, etc., is provided. However, since they do no have such a large amount of heat generation as the laser diode for CD use, and also since the distance between those elements is larger than that between the laser diode 27 for CD use and the laser driver circuit board 29, as well as, in heat radiation volume by means of the pickup housing 24, the thermal interference is smaller than that between the laser diode 27 for CD use and the laser diode driver circuit board 29 for CD use.

In the present embodiment, a portion lies in the pickup housing 24 being formed as one unit, where the laser diode 27 for CD use and the laser diode 28 for DVD use, the prism 31, the mirror 30, the lens 33, the optical detector 34, etc., are disposed, and it is not divided into sections by means of the heat separation member 25. Thus, the thermal deformation of the pickup housing 24 is small, therefore it is possible to make the relative positional shift and/or angular shift (a tilt of the element) between those elements small, thereby to improve the accuracy in the reproducing/recording operation.

According to the present embodiment, it is possible to prevent thermal interference from occurring between the elements provided within the optical pickup 4, therefore it is possible to make effective use of the pickup housing 24 as a heat radiation member, thereby protecting the laser diodes 27 and 28 from deterioration which leads to reduction of the lifetime thereof due to the heat. With this, it is possible to obtain a disc driving apparatus which is highly reliable and is able to achieve high definition reproducing/recording.

Next, a second embodiment according to the present invention will be described with reference to FIGS. 3(a), 3(b) and FIGS. 4(a) to 4(d). The FIGS. 3(a) and 3(b) show a plane view and a cross-sectional view, respectively, of an optical pickup in the disc driving apparatus according to the second embodiment. FIGS. 4(a) to 4(d) are diagrams illustrating the condition of flow-through within the optical pickup mentioned above. However, in this second embodiment, an explanation will be omitted of those portions duplicating elements in the first embodiment. Also, in this second embodiment, the constituent elements commonly provided in the first embodiment achieve the same effects thereof.

The function of the optical pickup 4 is to reproduce or record information on the disc 1. For this reason, in the disc driving apparatus 40 (see FIG. 1), there is provided a means for shifting or moving the optical pickup 4 to a predetermined position on the disc 1, and as a guide for it, in the side of the apparatus, for example, there is provided a main shaft guide bar 21 (seen in the upper side in FIGS. 3(a) and 3(b)) and a secondary shaft guide bar (seen in the lower side in FIGS. 3(a) and 3(b)). For supporting the pickup housing 24 so that it is freely slidable in the direction of the guide bars 21, two slide bearings 22 (for the main shaft) are inserted with pressure onto the pickup housing 24, on the side of the main shaft guide bar 21, and on the other side, the secondary shaft guide bar 21 supports only the one piece slide bearing 23 formed with the housing as one unit.

Within the pickup housing 24, there are provided two detection systems for a CD and a DVD, i.e., the parts or elements, such as, the laser diode 27 (of wavelength, 780 nm) for CD use and the laser diode 28 (of wavelength, 650 nm) for DVD use as the detection light source, the mirror 30, the prism 31 and the collimator lens 32 for guiding those detection light beams onto the disc 1, the optical detector 34 commonly used for the CD and DVD, for detecting the reflection light from the disc 1, the driver circuit board 29 for the laser diode 27 for CD use, and the driver circuit and the high frequency module for the laser diode 28 for CD use, and the objective lens driver 26 equipped with the objective lens for determining the detection light on the disc 1 at a predetermined portion accurately, etc. A mirror 30 is attached on each upper surface of the laser diodes 27 and 28 for CD use and DVD use, so that the detection light emitted from each of the laser diodes 27 and 28 is detected in an inner direction on the surface of the optical pickup 4. For positioning those parts or elements therein, the pickup housing 24 is formed into a box-like shape with the sidewall 24a and the bottom wall 24b, wherein the laser diode 27 for CD use, the laser diode 28 for DVD use, the optical detector 34, etc., are mounted on and attached to the bottom surface of the housing, while the other optical parts or elements are mounted within the housing.

With the present embodiment, the heat separation member 25 is provided in the pickup housing 24 for thermally separating the laser diode 27 for CD use, the laser diode 28 for DVD use, the laser driver circuit board 29 and the objective lens driver 26 from other within the housing, among those mounted elements which produce heat generation therein when the apparatus operates. The pickup housing 24 is made of a metal material, such as aluminum, magnesium, zinc, etc. The heat separation member 25 is formed by using a PPC resin (polyphenylene sulfide), polycarbonate, polystyrene, etc. When taking the strength or rigidity of the pickup housing 24 into the consideration, it is preferable to put in or mix a material, such as glass filler, etc., into the martial thereof, for increasing the rigidity thereof. The thermal conductivity is about 200 kcal/mh° C. for aluminum, about 150 kcal/mh° C. for magnesium, about 100 kcal/mh° C. for zinc, and 0.2 kcal/mh° C. for the material of the resin group. Therefore, using the heat separation members 25 reduces the heat flow by as much as about 0.001 times compared to the thermal flow-through within the pickup housing 24.

Further, it is also possible to separate them by making each of the heat separation members only in the form of a slit, thereby thermally separating them by an air layer. In this case, since the thermal conductivity of the air is about 0.03 kcal/mh° C., being smaller than that of a material of the resin group, it has a large effect on the heat separation. However, since the rigidity of the optical pickup 4 is lowered, the heat separation member 25 will be needed if further rigidity is necessary for the optical pickup 4. Also, if the slit portion and the recessed gutter in the pickup housing 24 are formed to have a fin-like structure (i.e., a concave and convex structure), in the case of being filled up with air to form an air layer, it is possible to improve the effect of heat radiation into the air, remarkably, with the effect of the heat separation.

Figure 3B:
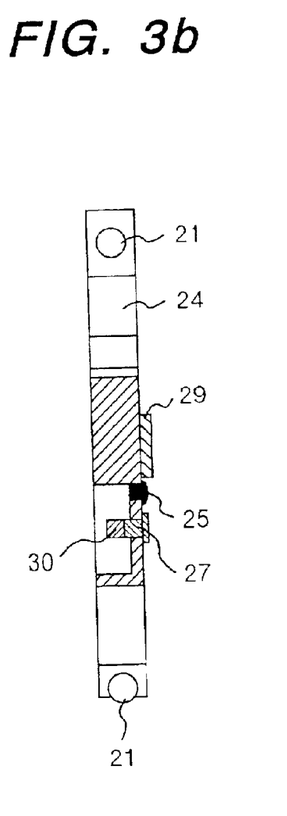

Also, as shown in the FIG. 3(b), the heat separation members 25 are provided from the bottom surface side of the pickup housing 24, while the side surface thereof is covered with a portion of the housing; therefore, it is possible to form the pickup housing 24 and the heat separation member 25 together as one unit rigidly. Further, from the point of view of separation from the heat source portion, such a structure may be applicable in which the heat generating-element is attached on the pickup portion as another element, and thereafter that portion is attached through the heat separation members 25.

In a CD hologram unit formed of the laser diode 27 for CD use and a light detector 34 for the CD system together as an unit, or in a DVD hologram unit formed of the laser diode 28 for DVD use and a light detector 34 for the DVD system together as an unit, the provision of the heat separation member 25 between those elements enables protection from thermal interference between them, and further, since no shifting of the detection light occurs on the optical detector 34 as far as no deformation is caused in the hologram unit portion, even when the housing portion is deformed due to a partial deformation by the heat separation member 25, it is possible to realize an optical pickup 4 having high reliability.

In the present embodiment, further, because of the box-like shape of the structure, wherein the laser diode 27 for CD use, the laser diode 28 for DVD use and the optical detector 34 are provided on the bottom wall of the pickup housing 24, thereby surrounding the optical pickup 4 with the side walls thereof in every direction, it is possible to improve the rigidity of the pickup housing 24 remarkably. For example, improvements can be obtained in the rigidity of the pickup housing 24 against bending and/or twisting, and on the vibration characteristics due to local deformation, or the like, and also relative positional shifting and/or angular shifting between the optical elements due to the deformation in the static pickup housing 24 can be suppressed.

According to this embodiment, it is possible to protect the elements from thermal interference between them, thereby protecting those elements from deterioration which leads to reduction in the lifetime thereof. With this, it is possible to provide an optical pickup 4 having high reliability. Also, an improvement can be obtained in the reliability of the disc driving apparatus, in which such an optical pickup is employed.

Next, by referring to FIGS. 4(a) to 4(d), an explanation will be given of the heat flow-through (arrows in the figure indicate the heat flows within the optical pickup housing members) and thermal separation within the pickup housing 24, along with the functions and effects thereof. Herein, an explanation is given of the case where the heat-generating elements within the optical pickup 4 are the laser diode 27 for CD use, the laser diode for DVD use, the laser driver circuit board 29 for the CD and the driver coil equipped with the objective lens driver 26, as shown in the drawings.

Figure 4A:
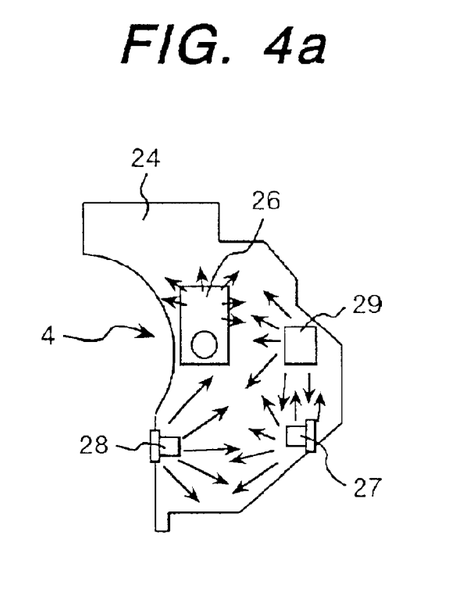
FIGS. 4(a) to 4(d) are diagrams illustrating the condition of thermal flow-through in the disc driving apparatus.

FIG. 4(a) shows the thermal flow-through (the flow of heat from members within the optical pickup housing) from the heat-generating elements when operating within an optical pickup 4 having no thermal separation structure therein. In general, the output of the laser diode 27 or 28 becomes very large when recording information on the disc 1, compared to the case of reproducing information on the disc 1. In the case of a DVD-ROM corresponding to a CD-R/RW device, the laser diode 28 for DVD use is used only for reproducing recorded information, exclusively; however, the laser diode 27 for CD use is used for both recording/reproducing, and, therefore, the heat generation from the laser diode 27 is large, in particular when recording. Also, the laser driver circuit board 29 provided within the housing is electrically connected with the laser diode 27, and so they should be disposed close to each other from the point of view of taking noises and unnecessary radiation into the consideration. For this reason, thermal interference occurs due to the mutual heat generation between the laser diode 27 for CD use and the laser driver circuit 19 for the CD, so that portion comes to be in a condition of being saturated thermally. Thus, it results in an increase in the temperature of a portion of the laser diode 27, thereby bringing about a deterioration leading to reduction in the lifetime of the laser diode 27 and/or malfunctions on the laser driver circuit board or each of the circuit boards provided with the apparatus. Also, thermal interference occurs due to heat radiation from the laser diode 28 for DVD use and the driver coil equipped within the objective lens driver 26, participating with the other heat-generating elements, and it causes thermal deformation of the housing through thermal distribution within the pickup housing 24, etc. The thermal deformation of the housing brings about a relative optional shifting and angular shifting, etc., between the optical elements, thereby causing deterioration of the optical characteristics (i.e., a shifting of the optical axis, and a positional shifting of the optic point on the optical detector).

Figure 4B:
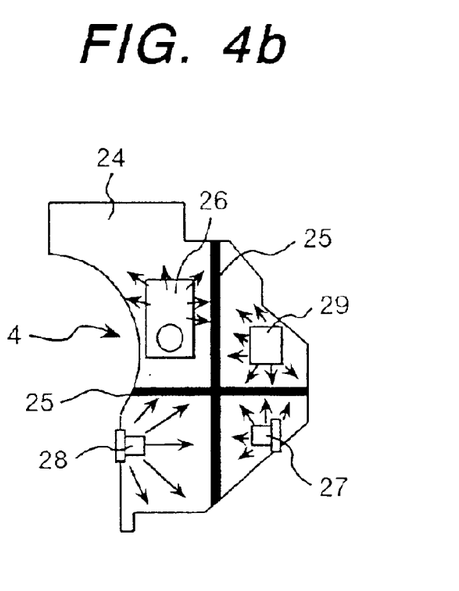

FIG. 4(b) shows a principal idea of the present invention, in which each of the heat-generating elements is separated within individual spaces inside of the optical pickup 4, and the heat separation members 25 are provided for separating those heat-generating elements, respectively. With provision of those heat separation members 25, which are made of a material having a smaller thermal conductivity than that of the housing, good thermal separation can be obtained. Also, with the volume of the housing portion being defined by enclosing respective heat-generating elements with the heat separation members 25 in individual spaces whose sizes depend upon the heat generation amount of each heat-generating element, it is possible to bring the pickup housing 24 as a whole into a condition of having an almost uniform thermal distribution therein. In this way, a localized heat distribution can be eliminated, so that the housing can be reduced down in temperature as a whole.

Figure 4C:
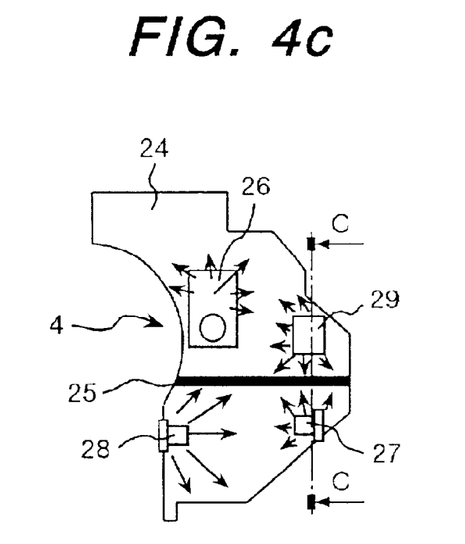

FIG. 4(c) shows a variation of the heat separation member 25 provided within the optical pickup 4. The heat separation member 25 is disposed in the present variation, so that the laser diode 27 for CD use and the laser driver circuit board 29 for the CD are separated from each other. Also, this heat separation member 25 is further elongated so as to separate the laser diode 28 for DVD use from the objective lens driver 26. With such a structure according to the present variation, as was mentioned above, the heat separation member 25 is provided for separating the laser diode 27 for CD use, having the largest heat generation amount, and the laser driver circuit board 29 for the CD, thermally, thereby protecting them from thermal interference therebetween; and, the heat flow from each element is directed in the direction away from the heat separation member 25, thereby making it possible to use the pickup housing 24 effectively as a heat radiation member. In this case, thermal interference between the laser diode 27 for CD use and the laser diode 28 for DVD use, or between the laser driver circuit board 29 for CD use and the objective lens driver 26 is small, according to the positional relationships between the heat generation amount from the respective elements and the distance between them (or, the cross-section of the area through which the heat conducts).

Also, the structure of the variation described above is effective, in particular, in the case where it is applied to an optical system having a CD system or a DVD system, wherein the optical elements, such as, the laser diodes 27 and 28, the optical detector 34, the prism 31 for guiding detection light from the laser diode 27 or 28 onto the objective lens of the objective lens driver 26 so as to be irradiated upon the disc 1 at the predetermined position thereof and for guiding the reflection light from the disc 1 back to the optical detector 34, the mirror 30, the lens 33, etc., are installed in the form of separate elements, respectively. This is because the deformation does not easily occur, when thermal deformation is caused in the pickup housing 24 due to the heat radiation from each heat-source element, or when a vibration characteristic (bent mode, twist mode, local deformation mode) is caused due to the rigidity of the portion of the pickup housing 24, since the portion where the optical elements are installed is formed as one unit (no provision of the heat separation member 25). If a material of the resin group or the like is used for the heat separation member 25, the stress accompanying the deformation is concentrated on this heat separation member 25, thereby relieving the stress at the portion where the optical elements are attached in advance; and, therefore, it has an effect to suppress the deformation.

Figure 4D:
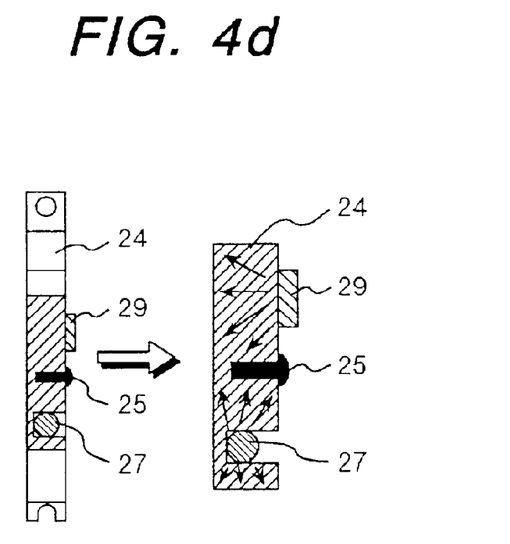

FIG. 4(d) shows a C—C cross-section of the optical pickup 4 shown in FIG. 4(c). As apparent from this figure, the laser diode 27 for CD use is provided within a cut-out portion provided in the bottom surface of the pickup housing 24, so as to be disposed at a predetermined position. The laser driver circuit board 29 for the CD is attached onto the bottom surface of the pickup housing 24. The heat separation member 25 is provided between those two elements; however, according to the present variation, with provision of a groove-like cut-out on the bottom surface of the pickup housing 24, the heat separation member 25, being made of material having a smaller thermal conductivity than that used for the housing, is inserted into this groove portion. Of course, it may be formed with the pickup housing 24 as one unit. Arrows shown in the figure indicate the heat flows from the heat-generating elements. Since the cross-sectional area of the housing portion between the elements (i.e., between the laser diode 27 for CD use and the laser driver circuit board 29 for the CD use) used for the heat separation member 25 is small, the heat amount flowing through this cross-section also is small, thereby enabling a thermal cut-off between the elements. As a result of this, it is possible to protect the elements from thermal interference therebetween. Herein, a small part of the cross-sectional area between the elements remains, but since this is for forming one unit, it is also possible to completely cut-off the heat flow by the heat separation member 25 between them.

In each of those embodiments mentioned above, the heat separation member(s) 25 is/are provided in a straight line-like manner; however, the heat separation member(s) 25 may be provided with a curved portion, a deleted portion therein, or they may have such a structure that the cross-sectional area is changed in a portion thereof.

According to each of the embodiments described above, with the provision of the heat separation member(s) 25 within the optical pickup 4, it is possible to separate the elements, such as the laser diode 29 and the laser driver circuit board 29, etc., which generate heat when reproducing information on the disc 1 or when recording the information on it, thermally within the pickup housing 24; therefore, it is possible to protect those elements 27 and 29 from thermal interference. In this way, each of those heat-generating elements 27 and 29, being disposed adjacent to each other, is able to radiate heat stably, without having to bear heat radiation effects from the other elements; therefore, it is possible to protect it from deterioration leading to reduction in the lifetime thereof. Also, with provision of the heat separation member 25, by taking the heat generation amount of the heat-generating elements 26 to 29 and the heat radiation volume in the housing members into the consideration, it is possible to obtain a uniform change in temperature within the pickup housing 24, thereby protecting the pickup housing 24 from thermal deformation due to the local temperature distribution therein. As a result, the detection light beam emitted from the laser diode 27 or 28 is guided onto the disc 1, and a relative positional shift and/or the shift in inclination, etc., within the optical elements, such as, the prism, the mirror, the lens, etc., for guiding the reflection light from the disc 1 onto the optical detector 34 is prevented. In the disc driving apparatus using such an optical pickup, it is possible to protect the circuits from a malfunction thereof, and also obtain an improvement in the reliability of the apparatus, thereby providing a disc driving apparatus capable of high definition.

As was fully explained above, according to the present invention, it is possible to reduce the thermal interference between the heat-generating elements disposed adjacent to each other in the optical pickup, so as to prevent the heat-generating elements from being deteriorated, leading to a reduction in the lifetime thereof, thereby obtaining a disc driving apparatus having a high reliability.

Also, according to the present invention, it is possible to reduce the thermal interference between the heat-generating elements disposed adjacent to each other in the optical pickup, so as to prevent the heat-generating elements from being deteriorated, leading to a reduction in the lifetime thereof, and also to make the shifting of the detection light small, so as to improve the accuracy in the operation of reproducing or reproducing/recording, thereby obtaining a disc driving apparatus having a high reliability and which is capable of high definition reproducing or reproducing/recording.

Further, according to the present invention, it is possible to reduce the thermal interference between the heat-generating elements disposed adjacent to each other in the optical pickup, so as to prevent the heat-generating elements from being deteriorated, leading to a reduction in the lifetime thereof, and also to maintain the strength of the pickup housing, so as to improve the accuracy in the operation of reproducing or reproducing/recording, thereby obtaining a disc driving apparatus having a high reliability and which is capable of high definition reproducing or reproducing/recording.

What is claimed is:

1. A disc driving apparatus, comprising:
   a housing of a disc drive:
   a rotation mechanism disposed within said housing for rotating a disc;
   an optical pickup mechanism disposed within said housing for reproducing or reproducing/recording information on the disc; wherein
   said optical pickup mechanism has an optical pickup and a driving mechanism for driving said optical pickup in a radial direction of said disc;
   said optical pickup comprises a pickup housing made of metal, in which are mounted a laser diode emitting detection light for reproducing or recording information on said disc, a laser driver circuit board for controlling said laser diode, an objective lens driver for guiding the detection light to a predetermined position on said disc and for guiding reflection light from said disc onto an optical detector, optical parts including a lens, a prism, a mirror, and said optical detector for detecting said detection light; and
   said laser diode and said laser driver circuit board are mounted in thermal contact with said pickup housing so as to be disposed adjacent to each other, while providing a thermal separation portion for thermally separating said laser diode and said laser driver circuit board;
   wherein said thermal separation portion comprises a dividing portion formed with either one of a slit portion or a recess gutter, for dividing said pickup housing, disposed between said laser diode and said laser driver circuit board, and a heat separation member disposed in said dividing portion.

2. A disc driving apparatus as defined in the claim 1, wherein said pickup housing is made of metal material having good thermal conductivity, and said thermal separation portion is formed by filling resin material into the separation portion of said pickup housing, thereby to form them in one body.

3. A disc driving apparatus, comprising:
   a housing of a disc drive;
   a rotation mechanism disposed within said housing for rotating a disc;
   an optical pickup mechanism disposed within said housing for reproducing or reproducing/recording information on the disc; wherein
   said optical pickup mechanism has an optical pickup and a driving mechanism for driving said optical pickup in a radial direction of said disc;
   said optical pickup comprises a pickup housing made of metal, in which are mounted a laser diode for emitting detection light for use with a CD, so as to reproduce or record information on said disc, a laser diode for emitting a detection light for use with a DVD, so as to reproduce or record information on said disc, a laser driver circuit board for controlling said laser diode for use with a CD, an objective lens driver for guiding the detection light to a predetermined position on said disc and for guiding reflection light from said disc onto an optical detector, optical parts including a lens, a prism, a mirror, and said optical detector for detecting said detection light: and
   said laser diode for use with a CD, said laser diode for use with a DVD, said laser driver circuit board and said objective lens driver are mounted in thermal contact with said pickup housing, wherein said laser diode for use with a CD and said laser driver circuit board are disposed adjacent to each other, and a thermal separation portion is provided for thermally separating an area occupied by said laser diodes for use with a CD and DVD and an area occupied by said laser driver circuit board and said objective lens driver within said pickup housing;
   wherein the prism and the mirror of said optical portions and said optical detector are disposed nearer to said laser diodes for use with a CD and DVD than to said thermal separation portion.

4. A disc driving apparatus, comprising:

a housing of a disc drive;

a rotation mechanism disposed within said housing for rotating a disc;

an optical pickup mechanism disposed within said housing for reproducing or reproducing/recording information on the disc; wherein said optical pickup mechanism has an optical pickup and a driving mechanism for driving said optical pickup in a radial direction of said disc;

said optical pickup comprises a pickup housing made of metal, in which are mounted a laser diode for emitting detection light for use with a CD, so as to reproduce or record information on said disc, a laser diode for emitting a detection light for use with a DVD, so as to reproduce or record information on said disc, a laser driver circuit board for controlling said laser diode for use with a CD, an objective lens driver for guiding the detection light to a predetermined position on said disc and for guiding reflection light from said disc onto an optical detector, optical parts including a lens, a prism, a mirror, and said optical detector for detecting said detection light; and said laser diode for use with a CD, said laser diode for use with a DVD, said laser driver circuit board and said objective lens driver are mounted in thermal contact with said pickup housing, wherein said laser diode for use with a CD and said laser driver circuit board are disposed adjacent to each other, and a thermal separation portion is provided for thermally separating an area occupied by said laser diodes for use with a CD and DVD and an area occupied by said laser driver circuit board and said objective lens driver within said pickup housing;

wherein said thermal separation portion is provided so as to thermally separate either one of between said laser diode for use of the CD and said laser diode for use of the DVD, and between said laser driver circuit board and said objective lens driver.

\* \* \* \* \*